United States Patent
Canis et al.

(10) Patent No.: US 11,093,867 B2
(45) Date of Patent: Aug. 17, 2021

(54) ENGINE FOR SEARCHING ITINERARIES

(71) Applicant: Amadeus S.A.S., Biot (FR)

(72) Inventors: Laure Canis, Nice (FR); Marek Herer, Nice (FR); Jerome Bertrand, Antibes (FR); Xavier Janin, Boulogne-Billancourt (FR); Feten Zmerli, Antibes (FR); Thibaud Andrevon, Vallauris (FR); Thomas Rondepierre, Antibes (FR)

(73) Assignee: AMADEUS S.A.S., Biot (FR)

( * ) Notice: Subject to any disclaimer, the term of this patent is extended or adjusted under 35 U.S.C. 154(b) by 830 days.

(21) Appl. No.: 15/663,041

(22) Filed: Jul. 28, 2017

(65) Prior Publication Data

US 2019/0034838 A1    Jan. 31, 2019

(51) Int. Cl.
| | |
|---|---|
| *G06Q 10/02* | (2012.01) |
| *G06Q 10/04* | (2012.01) |
| *G06Q 50/14* | (2012.01) |
| *G06F 16/9535* | (2019.01) |
| *G06F 16/2457* | (2019.01) |

(52) U.S. Cl.
CPC ..... *G06Q 10/025* (2013.01); *G06F 16/24578* (2019.01); *G06F 16/9535* (2019.01); *G06Q 10/047* (2013.01); *G06Q 50/14* (2013.01)

(58) Field of Classification Search
CPC .... G06Q 10/025; G06Q 10/047; G06Q 50/14; G06F 16/9535; G06F 16/24578; G06F 9/544
See application file for complete search history.

(56) References Cited

U.S. PATENT DOCUMENTS

| | | |
|---|---|---|
| 2005/0288974 A1 | 12/2005 | Baranowski et al. |
| 2011/0225012 A1 | 9/2011 | Harwood et al. |
| 2012/0143882 A1* | 6/2012 | Zheng .............. G06Q 10/08 707/751 |

(Continued)

OTHER PUBLICATIONS

S. Moussa, M. Soui and M. Abed, "A multi-criteria decision making approach for personalization itineraries in intelligent transport systems," 2013 International Conference on Advanced Logistics and Transport, 2013, pp. 94-99 (Year: 2013).*

(Continued)

*Primary Examiner* — George Chen
*Assistant Examiner* — Wayne S. Murray
(74) *Attorney, Agent, or Firm* — Thompson Hine LLP

(57) ABSTRACT

Systems, methods and computer program products associated with a flight search engine for searching itineraries between an origin and a destination on a given date, according to a predefined display policy. Available routes may be filtered according to a first set of predefined criteria associated with the routes. The filtered available routes may be ranked according to a second set of predefined criteria. Itineraries may be constructed that are associated with the filtered available routes. The constructed itineraries may be filtered according to a third set of predefined criteria, and the filtered itineraries may be ranked according to a fourth set of predefined criteria. Historical booking data regarding previously booked itineraries for future travels may be received and analyzed, and may be taken into in the ranking of the filtered available routes and the filtered itineraries.

15 Claims, 7 Drawing Sheets

(56) References Cited

U.S. PATENT DOCUMENTS

2013/0283293 A1* 10/2013 Lagerblad ............. G06F 9/5033
719/314
2013/0290324 A1* 10/2013 Gibergues ........... G06F 16/9535
707/731
2014/0122817 A1*  5/2014 Browning ........... G06F 11/2094
711/162

OTHER PUBLICATIONS

Kückens et al., "An approach of solving itinerary construction problems using real life data", 2013 IEEE Symposium on Computational Intelligence in Scheduling (CISched), Singapore, 2013, pp. 28-35.
SQLite, reference document, Jan. 1, 20014, retrieved from the internet at https://www.sqlite.org/lockingv3.html.
National Institute of Industrial Property, Preliminary Search Report issued in French Application No. 175177 dated May 3, 2018.

* cited by examiner

ENGINE FOR SEARCHING ITINERARIES

TECHNICAL FIELD

The present invention relates to systems, methods, and computer program products associated with a flight search engine.

BACKGROUND

Computer technology is used to search for flights and book flights. To search a flight, a user, e.g., either a traveler, a travel agent or a third party agent, may access a user interface connected to a flight search system. The user inputs an origin and destination and an outbound and inbound date. To process this data in order to deliver a suggested itinerary, a flight search engine or journey planner, having access to flight schedules, is queried.

The flight search engine returns, for each path of the journey, a set of itineraries, for which the availability is checked. Available itineraries are combined into itineraries, corresponding fares are searched and a list of recommendations is presented to the user.

Because flight search engines receive a very high volume, they need to reply quickly and in an optimized way. For one origin and destination, the possible routes and itineraries are numerous. Flight search engines apply a filtering and ranking process to discard improbable routes and itineraries, thus limiting the computing time of the corresponding fare search.

However, the filtering and ranking may discard itineraries that are attractive to the traveler. For a given origin and destination, for example Sydney-London, travelers may prefer a cheaper flight including more stopovers to a shorter but more expensive flight, yet a flight search engine may discard this type of flight based on its high mileage and elapsed time. Travelers may also prefer specific stop-over airports such as Dubai, but selected routes for Sydney-London may not involve such stopovers.

SUMMARY

Flight search engines in accordance with embodiments of the invention take into account the actual preferences of travelers for a given origin and destination, and may change the filtering and ranking criteria once set.

In an embodiment, an engine for searching itineraries between an origin and a destination on a given date, according to a predefined display policy, is provided. The engine includes a route finding module for computing available routes to fly from the origin to the destination, according to the predefined display policy, a route filtering module for filtering the available routes according to a first set of predefined criteria associated with the routes, a route ranking module for ranking the filtered available routes according to a second set of predefined criteria associated with the routes, an itinerary finding module for constructing itineraries associated with the filtered available routes on the given date according to the predefined display policy, an itinerary filtering module for filtering the constructed itineraries according to a third set of predefined criteria associated with the itineraries, and an itinerary ranking module for ranking the filtered itineraries according to a fourth set of predefined criteria associated with the itineraries. The engine further includes a module for receiving and analyzing historical booking data regarding previously booked itineraries for future travels. The route ranking module or/and the itinerary ranking module take into account the historical booking data.

According to another embodiment, a system for answering a user request for a flight from an origin to a destination on a given date is provided. The system includes a processor connected to a network, a flight search engine as described above, an availability module, a fare calculator module, and at least one client device including a user interface. The system is arranged for receiving a user request comprising an origin, a destination and a date via the user interface, querying the flight search engine with the user-specified criteria, querying the availability module with the itineraries returned by the flight search engine, sending the available itineraries returned by the availability module to the fare calculator, and filtering and ranking the priced itineraries and displaying a subset of these on the user interface.

According to another embodiment, a method of processing a user request is provided. The method of processing a user request includes receiving a user request comprising an origin and a destination and a date of a journey, submitted by the user via a user interface, computing available routes to travel from the origin to the destination according to a display policy, performing filtering of all available routes according to at least a first set of predefined criteria associated with the routes, performing ranking of the filtered routes according to at least a second set of predefined criteria associated with the routes, whereby a first score value for each of the filtered routes is used, selecting a predefined number of the filtered and ranked available routes, obtaining schedule information corresponding to the segments in the selected routes, computing, according to a display policy, available itineraries for each route by assembling schedules associated with the segments of the route, performing filtering of all available itineraries according to a third set of predefined criteria associated with the itineraries, and performing ranking of the filtered itineraries according to a fourth set of predefined criteria associated with the itineraries whereby a first score value for each of the filtered itineraries is created.

According to another embodiment, a computer program product is provided for processing a user request. The computer program product includes a non-transitory computer-readable storage medium, and program code stored on the non-transitory computer-readable storage medium that, when executed by one or more processors, causes the one or more processors to carry out the method described above.

In this document, a segment may be a connection between two airports. A schedule may be a connection between two airports with a specified departure and arrival time. A route may be a sequence of segments between an origin and a destination. An itinerary may be a sequence of schedules to travel from an origin to a destination. An itinerary may also be a sequence of schedules to travel from an origin to a destination and back from the destination to the origin if the journey request concerns a round trip.

An engine may be provided for searching itineraries between an origin and a destination on a given date. In some embodiments, the engine may search the itineraries according to a predefined display policy. The predefined display policy corresponds to search engine provider specific search constraints and ranking criteria for the search results.

The engine may include, for example, a route finding module for computing available routes to fly from the origin to the destination, according to the predefined display policy. Available routes are routes to travel indeed offered by the flight travel provider to which the engine is linked. An available route is for example "from Munich to Stockholm via Dusseldorf". The available routes are, for example, computed by building a successors list for each segment, also referred to as segment tree, and traversing through the segment tree with a recursive depth-first search in order to find an actually available sequence of segments between the requested origin and destination, i.e. the route.

The engine may include, for example, a filtering module for filtering the available routes according to a first set of predefined criteria associated with the routes. Suitable criteria for the filtering are, for example, the minimum expected flying time associated with a route, the number of intermediate stops or the like. The engine, for example, also comprises a route ranking module for ranking the filtered, available routes according to a second set of predefined criteria associated with the routes. The ranking of the routes is, for example, accomplished by calculating at least one score value associated to each route and comparing these score values to each other. Examples for the second set of predefined criteria, i.e. the ranking criteria, are, for example, a density of schedules on a specific route or a mileage associated with the route.

The engine may include, for example, an itinerary finding module for constructing itineraries associated with the filtered, available routes on the given date, according to the predefined display policy. The itineraries are constructed, for example, by retrieving schedule data for each segment of the route and combining the retrieved schedule data with the routes to an itinerary, for example, in a way that a changeover between the different segments of the route is possible, hence with constraints related to the departure and arrival time of certain schedule—such that an itinerary with, for example, a plane arriving after the successor plane has already taken off is ruled out. The engine, for example, also comprises an itinerary filtering module for filtering the constructed itineraries according to a third set of predefined criteria associated with the itineraries. This filtering module, for example, selects only itineraries that respect a specific maximum ground time for the passenger or the like. The engine further, for example, comprises an itinerary ranking module for ranking the filtered itineraries according to a fourth set of predefined criteria associated with the itineraries. Also this ranking, is for example, achieved by sorting itineraries according to certain score values.

Furthermore, the engine may include a module for receiving and analyzing historical booking data regarding previously booked itineraries for future travels. At least one of (i) the route ranking module or (ii) the itinerary ranking module take into account said historical booking data.

Hence, for example of the ranking for routes or itineraries carried out by the respective modules is also based on historical booking data regarding previously booked itineraries or routes. Hence, for example, more popular or more frequently booked routes or itineraries are ranked higher than others.

In some embodiments, the engine may be arranged to receive and analyze historical booking data wherein the route ranking module or the itinerary ranking module takes into account the historical booking data. Therefore, the engine is, for example, equipped with an interface for receiving, e.g., a list with a number of bookings for a certain route or itinerary. In some embodiments, the route finding module is connected to a data source comprising route segment information, for example, a list of available segments, and is configured to find available segments and assemble them into available routes between the origin and the destination according to the predefined display policy.

The itinerary finding module is, for example, connected to a data source comprising schedule information and is configured to find schedules associated with the segments of the available routes between the origin and the destination, and to assemble them into available itineraries according to the predefined display policy.

In some embodiments, the first set of predefined criteria include a minimum expected flying time associated with a route. Hence, the filtering module for filtering the available filters the route(s) according to a minimum expected flying time(s) associated with them. In this way, for example, route(s) with a minimum expected flying time, which is (are) too high according to a predefined display policy are filtered out.

In some embodiments, the second set of predefined criteria includes the minimum expected flying time, a mileage and a density of schedules associated with a route. Hence, the available routes are ranked according to mileage and density of schedules associated with a route. They are, for example, ranked using separate score values for mileage and density of schedules, wherein routes with a short mileage and a high density of schedules are the higher ranked ones.

In some embodiments, the third set of predefined criteria may include a minimum connection time and a maximum ground time in a connection point between two segments associated with an itinerary. Hence, the itinerary filtering module filters the constructed itineraries according to a minimum connection time and a maximum ground time in a connection point between two segments associated with an itinerary. In this way, for example, only itineraries lying between these borders are considered a valid itinerary.

In some embodiments, the fourth set of predefined criteria may include the elapsed time associated with an itinerary. Hence, the itinerary ranking module ranks the filtered itineraries according to their elapsed time. Typically, for example, itineraries with a low elapsed time are ranked higher than those with a high elapsed time. Also this ranking, is, for example, achieved by calculating a score value associated with an itineraries' elapsed time and ordering a list of itineraries according to such a score value.

In some embodiments, the historical booking data may include a number of bookings for a specific route or itinerary, a maximum number of bookings on routes or itineraries between the origin and destination and a quantity of information about routes or itineraries between an origin and destination, wherein the quantity of information about routes between the origin and destination is related to a distribution of a number of bookings across the quantity of available routes or itineraries between the origin and destination.

The quantity of information can be given by several indicators, for example, indicative of the number of available routes from the origin to the destination and an average number of bookings for all possible routes over a given timeframe in the past. It is also possible that these exemplary indicators are summarized to a single number representing the quantity of information.

In general, the more reliable bookings statistics on a certain route or itinerary are, the higher is the quantity of information. To provide an example, if for a specific origin and destination with a large total number of bookings, a vast majority (e.g., >80%) of bookings was registered for only two routes or itineraries between them, the reliability of booking statistics among those routes between the specific origin and destination is increased. This is reflected e.g. by a high quantity of information number for routes or itineraries between the origin and destination. In contrast, if the origin and destination has only few bookings, and they are scattered across many routes, the booking statistics for these routes or itineraries is rather bad, which is reflected e.g. by a low quantity of information number for routes or itineraries between the origin and destination.

In some embodiments, at least one of (i) the route ranking module or (ii) the itinerary ranking module take into account said historical booking data by utilizing at least one score value for ranking the itineraries or the routes. In some examples, a score value, herein referred to as "third score value", is obtained by combining a first score value associated with at least one of the (i) first, (ii) the second, (iii) the third or (iv) the fourth set of predefined criteria with a second score value. The first, second, third and fourth set of criteria are, for example, chosen as described above.

The second score value, to which the first score value is combined, may be, for example, based on a popularity value. The popularity value corresponds, for example, to a weighted ratio calculated by weighting a ratio of the number of bookings for a specific route or itinerary and the maximum number of bookings on routes or itineraries between the origin and destination with the quantity measure for information about a route or itinerary. This functional relationship is, for example, by a formula of the following sort:

$$\text{second score value} = \text{weight}_{OD}(\text{quantity of information}) \frac{\text{\# bookings}_{route}}{\text{max bookings}_{OD}}$$

wherein the $\text{weight}_{OD}$ is dependent on the quantity of information about routes or itineraries between the origin and destination, $\text{\#bookings}_{route}$ is the number of bookings for a specific route and $\text{max bookings}_{OD}$ is the maximum number of bookings on routes or itineraries between the origin and destination.

The quantity of information about routes or itineraries between the origin and destination, being related to the distribution of bookings across the routes and itineraries between the origin and destination is, for example, calculated by a formula of the following sort:

$$\text{quantity of information} = n * \left(1 + \sum_{i}^{i=N} \frac{p_i * \log(p_i)}{\log(n)}\right)$$

wherein n is the number of different routes and $p_i$ are the statistical frequencies of the routes or itineraries between the origin and destination.

A third score value is, for example, obtained by combining the first score value and the second score value. This functional relationship might be implemented by a formula of the following sort:

third score value=second score value+first score value.

Upon calculation of the above specified third score value, the route or itinerary is ranked by at least one of (i) the route ranking module or (ii) the itinerary ranking module based on the third score value.

In some embodiments, the data source may include schedule information, to which the route finding module is connected to, is, for example, at least one marketing information data transfer file, i.e. an MIDT file. Since MIDT files require a reasonable amount of memory space, the MIDT file is subsequently converted into at least one SQLite file. The at least one SQLite file(s) is (are) read by a daemon and written to shared memory blocks by the daemon. The shared memory blocks are simultaneously accessed by at least one of (i) the route finding module, (ii) the route filtering module, (iii) the route ranking module, (iv) the itinerary filtering module and (v) the itinerary ranking module, which are located on at least one server.

The itineraries are, for example, built from the scheduling information stored in the SQLite files, accessible through the shared memory. The shared memory blocks are, for example, built during a batch process and synchronized with the latest updates through a queue system. This will enable the engine to provide that at least one of (i) routes or (ii) itineraries are always built from information which is as most up-to-date as possible. This is important, as all data required by the process (such as schedules, airlines preferences and parameters, etc.) need then to be accessible in the fastest possible way. This is ensured by the shared memory blocks.

In some embodiments, the shared memory blocks may be synchronized with latest updates of the marketing information data transfer file though a distributed data queue system.

Schedule data may be, for example, built asynchronously, and so, can become obsolete quickly. This is why, upon online updates, the shared memory blocks are modified quickly, for example, using distributed queues to mitigate obsolescence risk. As a single queue works according to the first-in first-out principle, the update rate of a single queue is low. A variety of distributed queues instead of a single queue can be updated more quickly. The distributed queues can be updated synchronously or asynchronously. The distributed queues are, for example, written to the distributed memory system. Different memory blocks of the shared memory block are, for example, read by different servers, on which different modules of the engine (route finding module, route filtering module etc.) are processed. There is, for example, at least one queue for each shared memory block.

The MIDT data may be, for example, loaded to the shared memory blocks by the daemon. The MIDT data is, for example, loaded to SQLite data files containing a pre-processed map indexed by origin and destination. The pre-processed map may comprise the max number of bookings on routes related to this origin and destination, the $\text{weight}_{OD}$, which is dependent on the quantity of information about the routes or itineraries from the origin to the destination, and the maximum number of bookings on routes or itineraries between the origin and destination.

According to another embodiment, a system for answering a user request for a flight from an origin to a destination on a given date is provided. The system includes a processor connected to a network, a flight search engine as described herein, an availability module, a fare calculator module, and at least one client device comprising a user interface.

The system is arranged for receiving a user request including an origin, a destination and a date via the user interface, querying the flight search engine with the user-specified criteria, querying the availability module with the itineraries returned by the flight search engine, sending the available itineraries returned by the availability module to the fare calculator, filtering and ranking the priced itineraries, and displaying a subset of these on the user interface.

According to another embodiment, a method of processing a user request is provided. The method includes receiving a user request comprising an origin and a destination and a date of a journey, submitted by the user via a user interface, computing available routes to travel from the origin to the destination according to a display policy, filtering all available routes according to at least a first set of predefined criteria associated with the routes, and ranking the filtered routes according to at least a second set of predefined criteria associated with the routes, whereby a first score value for each of the filtered routes is used. The method further includes selecting a predefined number of the filtered and ranked available routes, obtaining schedule information corresponding to the segments in the selected routes, computing, according to a display policy, available itineraries for each route by assembling schedules associated with the segments of the route, filtering all available itineraries according to a third set of predefined criteria associated with the itineraries, and ranking the filtered itineraries according to a fourth set of predefined criteria associated with the itineraries whereby a first score value for each of the filtered itineraries is created. The first score value is, for example, associated with at least one of the (i) first, (ii) the second, (iii) the third or (iv) the fourth set of predefined criteria with a second score value. The first, second, third and fourth set of criteria are, for example, chosen as described herein.

In some embodiments, at least one of the activity of ranking the filtered routes according to at least a second set of predefined criteria and the activity of ranking the filtered itineraries according to a fourth set of predefined criteria includes the activities of (1) obtaining, for each filtered route or itinerary, historical booking data regarding the route associated with the itinerary, and (2) computing, based on the historical booking data, the popularity value of the filtered route or itinerary. The popularity value of the filtered route or itinerary is, for example, computed as described above. The activities further include ranking the filtered routes or itineraries based on the popularity value of the route associated with the itinerary, whereby a second score value is created for each route or itinerary, combining the first and second score values to routes or itineraries that are present in both all the filtered routes or itineraries and the routes associated with the itineraries to obtain a third score value for those routes or itineraries, and ranking the filtered routes or itineraries, based on the third score value for each route or itinerary.

In some embodiments, after the activity of ranking the filtered itineraries according to a first set of predefined criteria, the activities of selecting a predefined number of the filtered and ranked available itineraries, obtaining availability information for each selected itinerary, obtaining fare information for each available itinerary to obtain priced available itineraries, and outputting a subset of filtered and ranked priced available itineraries on the user interface are performed.

The method may be performed by an engine or by a system as described herein.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. Like reference signs refer to like elements throughout the following description of embodiments.

DETAILED DESCRIPTION

Figure 1:
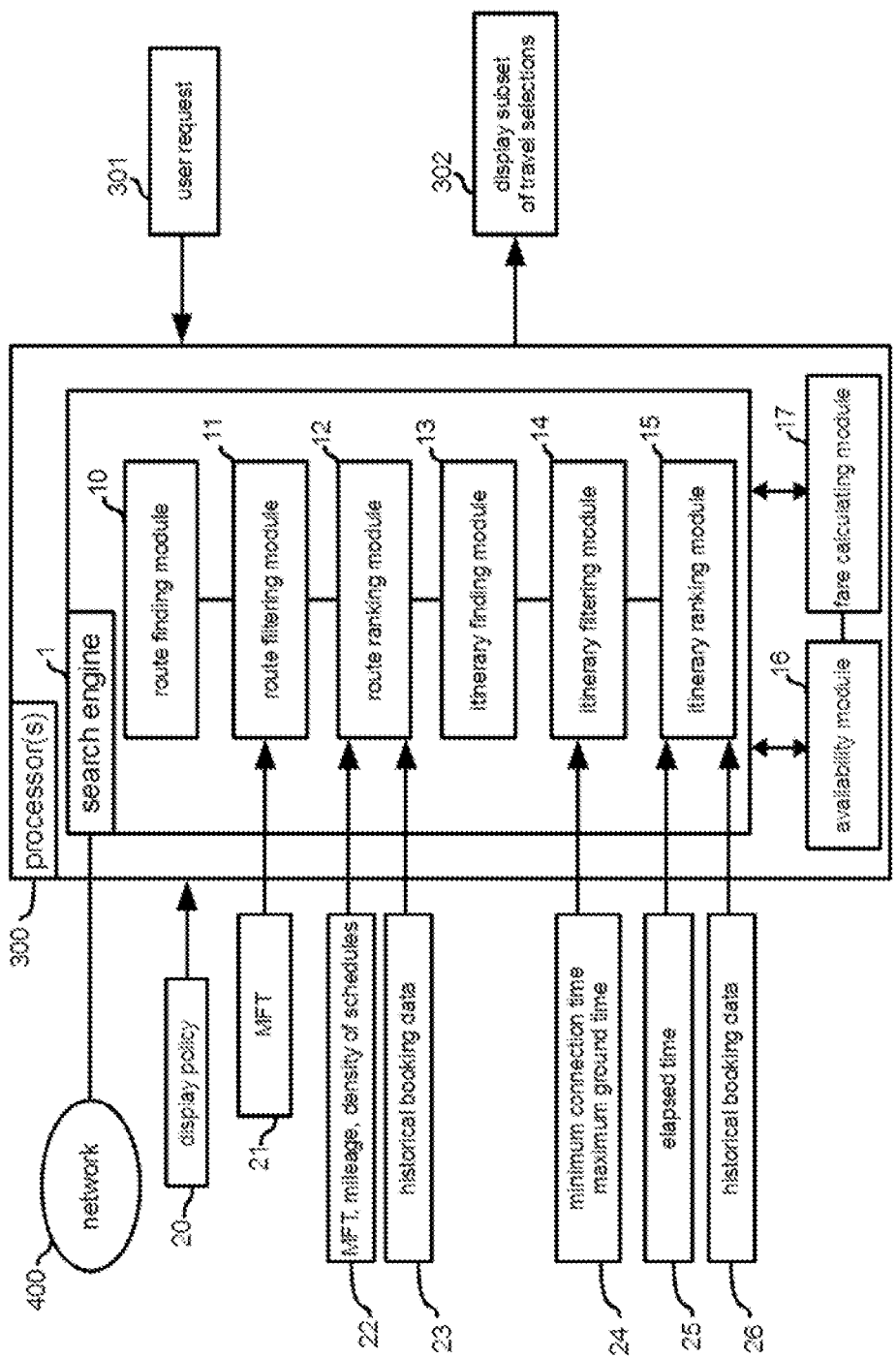
FIG. 1 is a diagrammatic view of an exemplary operating environment for searching flights between an OnD, including a processor carrying out a search engine, being connected to a computer network.

A diagrammatic view of an exemplary operating environment for searching flights between an OnD, including a processor carrying out a search engine 1 is shown, being connected to a computer network 400, in FIG. 1.

At least one processor 300 of a single server or a plurality of servers (not shown) in FIG. 1 runs a search engine for processing user travel requests, in particular flight search requests, such as user request 301. A route finding module 10 of the search engine 1 is programmed to process user request 301 in order to find available routes via according to a display policy 20. These routes are found by building a successors list for each segment, also referred to as segment tree, and traversing through the segment tree with a recursive depth-first search.

The search engine 1 also has a route filtering module 11, which is programmed to filter the obtained routes according to a first set of predefined criteria 21, given by the minimum expected flying time, also referred to as MFT. A route ranking module 12 provided by the search engine 1 is programmed to rank the filtered routes according to a second set of predefined criteria 22, namely the NFT, mileage and density of schedules and historical booking data 23. An itinerary finding module 13 of the search engine 1 is programmed to find available itineraries matching the ranked routes. An itinerary filtering module 14 is programmed to filter the itineraries obtained by the itinerary finding module 13 according to a third set of predefined criteria 24, given by minimum connection time and maximum ground time. An itinerary ranking module 15 is programmed to rank the filtered itineraries according to elapsed time and historical booking data 23. Hence, the output of the search engine 1 is a set of filtered and ranked itineraries.

The search engine 1 is coupled to an availability module 16 also carried out by the processor(s) 300, to ensure all routes and/or itineraries obtained are actually available. Furthermore, the search engine is coupled to a fare calculation module 17, which is programmed to price the filtered and ranked itineraries obtained by the search engine 1. A subset of the obtained priced itineraries are displayed to a user according to a display subset of travel selections order 302 by the processor(s).

Figure 2:
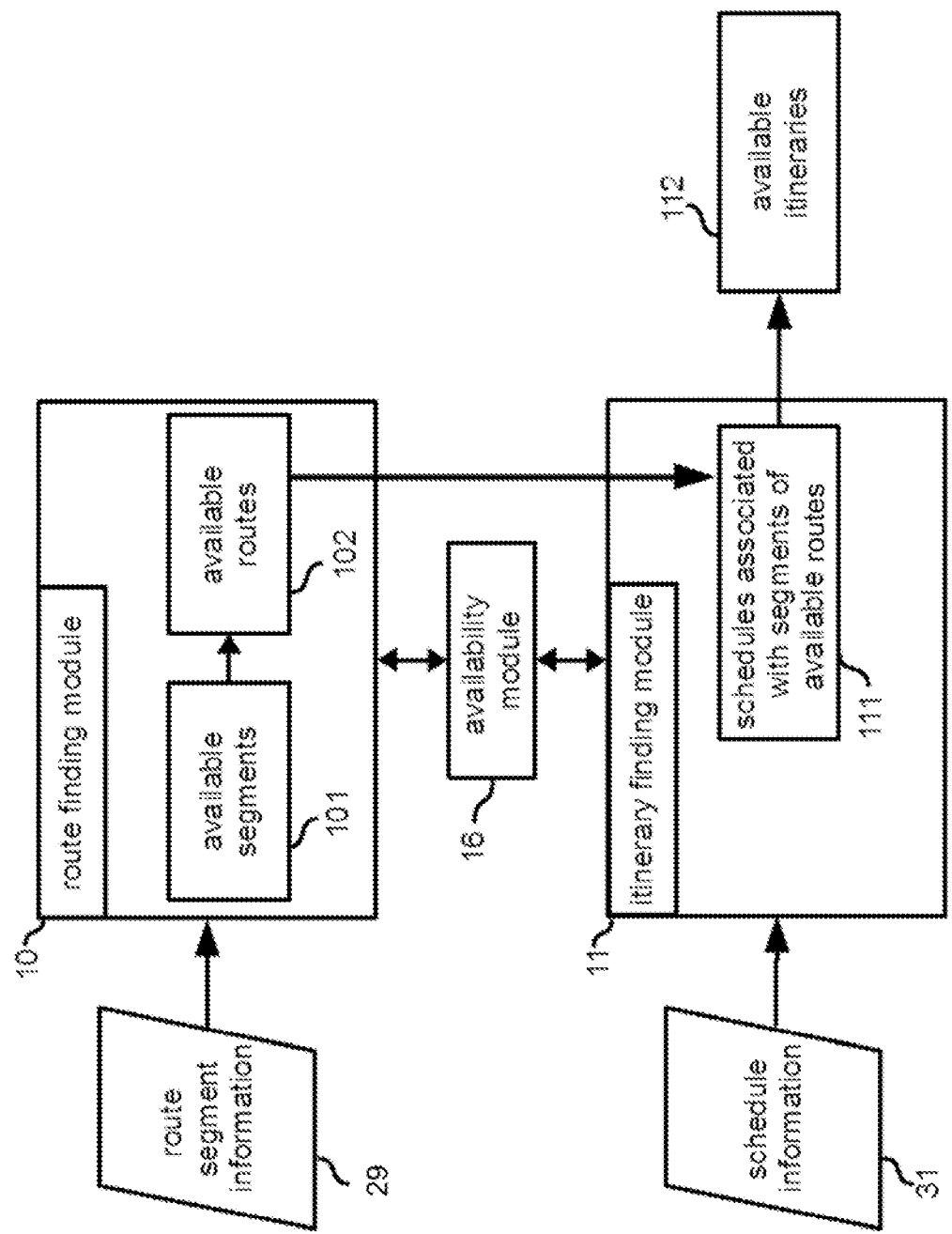
FIG. 2 is a diagrammatic view of a cooperation between a route finding module, an availability module, and an itinerary finding module within the search engine of FIG. 1.

A diagrammatic view of a cooperation between a route finding module, an availability module and an itinerary finding module within the search engine of FIG. 1, is shown in FIG. 2.

Route segment information 29, such as a segments tree, is fed forward to the route finding module 10. The route finding module 10 traverses through the route segments information 29 and communicates with the availability module 16 to obtain available segments 101. These available segments 101 are assembled by the route finding module to create available routes 102.

The available routes 102 are combined with schedule information 31 by the itinerary finding module 11. To accomplish that, the itinerary finding module 11 combines the available routes, or more exactly, their segments, with schedules associated with segments of the available routes 111 to obtain available itineraries 112. The schedules and the routes are, for example, combined only to feasible itineraries, as, for example, itineraries with departure time at an airport before an arrival time of the to be connected flight at the airport, are excluded.

Figure 3:
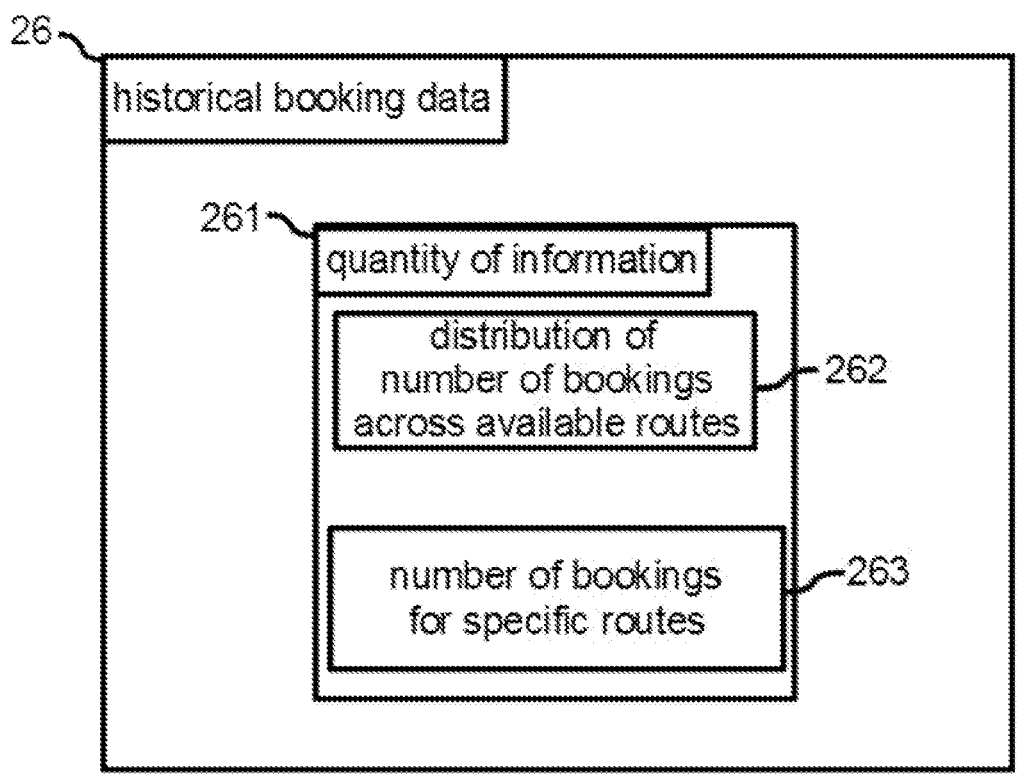
FIG. 3 is a schematic view of information contained in historical booking data.

A schematic overview over historical booking data 26 and possible content of this data is given by FIG. 3.

The historical booking data 26, for example, includes a distribution of a number of bookings across available routes 262. This distribution 262 is, for example, obtained out of raw booking data, showing which flights between specific origins and destinations have been booked how often in the past. The distribution of a number of bookings across available routes 262 is, together with the number of bookings for specific routes 263 an indicator for the quantity of information 261 which is available for a certain route.

When the distribution of the number of bookings across available routes 262 has a clear tendency towards a small number of routes and a high number of bookings has been recorded for those routes—the quantity of information 261 about these routes is high. However, if the distribution of the number of bookings across available routes 262 is rather random and, for example, additionally the number of bookings for the specific routes 263 is small, the quantity of information 261 about these routes is low.

Figure 4:
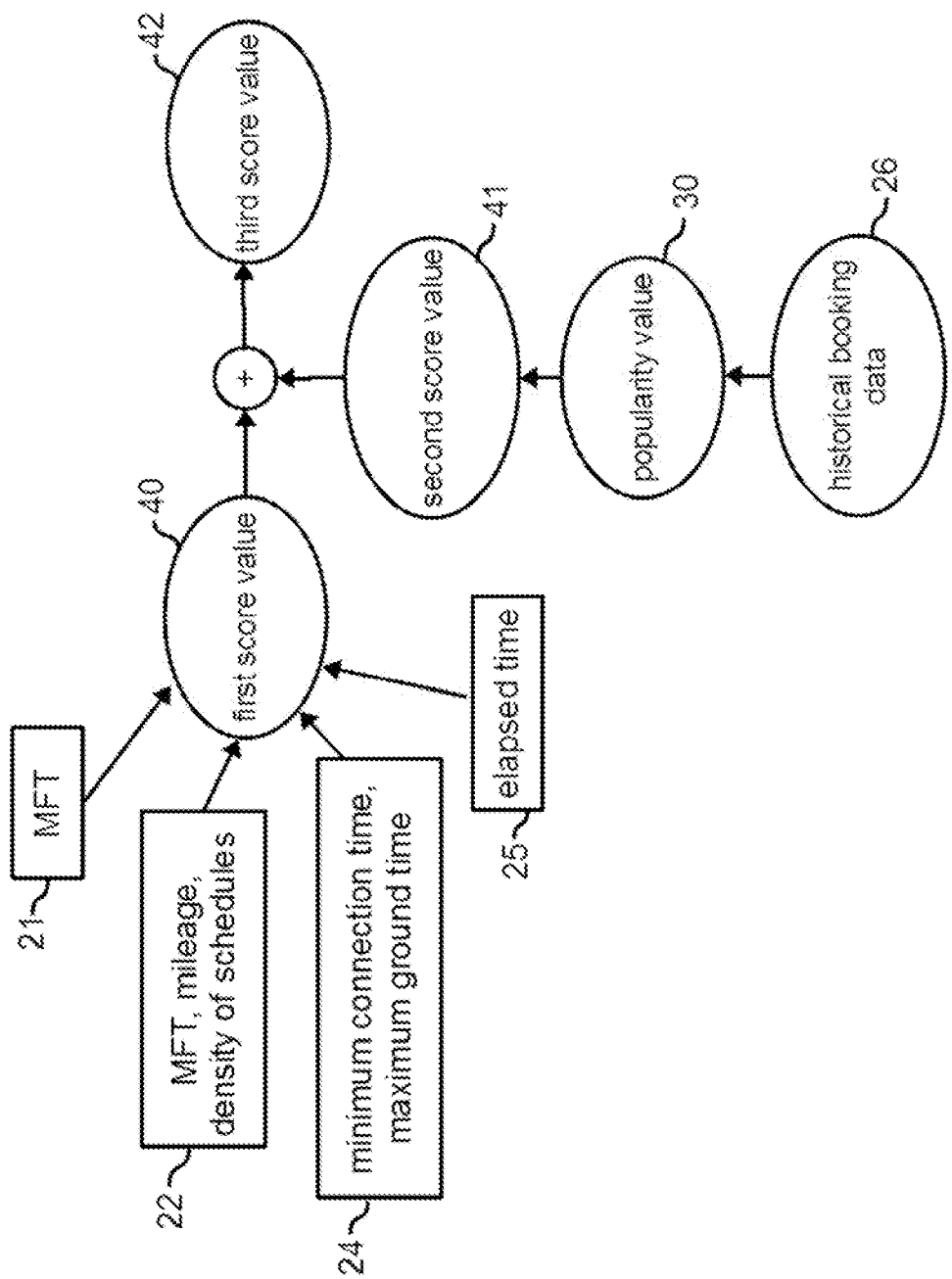
FIG. 4 is a schematic view of how historical booking data is processed along with minimum expected flying time, mileage, density of schedules, and other criteria to obtain a score value for ranking routes and/or itineraries.

A schematic view of how historical booking data is processed along with minimum expected flying time, mileage, density of schedules and other criteria to obtain a score value for ranking routes and/or itineraries in the route ranking module 12 and/or itinerary ranking module 15 is shown in FIG. 4.

The first set of predefined criteria 21, in this example given by MFT, the second set of predefined criteria 22, given by MFT, the mileage of a travel and a density of schedules and the third set of predefined criteria 24, given by the minimum connection time and the maximum ground time, and a fourth set of predefined criteria 25, given by the elapsed time are combined to a first score value 40. Score values, as the first score value 40 are, for example, used when ranking the routes and/or itineraries. In the ranking, the routes or itineraries, are, for example, ranked by sorting them by a rising or falling score value.

A second score value 41 is computed, subsequently or parallel to the first score value 40, on the basis of a popularity value 30. The popularity value 30 is derived, among other things, from the historical booking data 26. The popularity value corresponds, for example, to a weighted ratio calculated by weighting a ratio of the number of bookings for a specific route or itinerary and the maximum number of bookings on routes or itineraries between the origin and destination with the quantity measure for information about a route or itinerary. The popularity value 30 might be calculated as described herein.

The second score value 41 is added to the first score value 40 to obtain a third score value 42. The third score value 42 combines historical booking data and the above mentioned predefined criteria for ranking and filtering such as MFT, maximum ground time etc.

The routes and/or itineraries are, for example, ranked according to the value of the third score value alone or are, for example, a first ranked according to the first score value, then ranked according to the second score value and finally ranked again according to the third score value.

Figure 5:
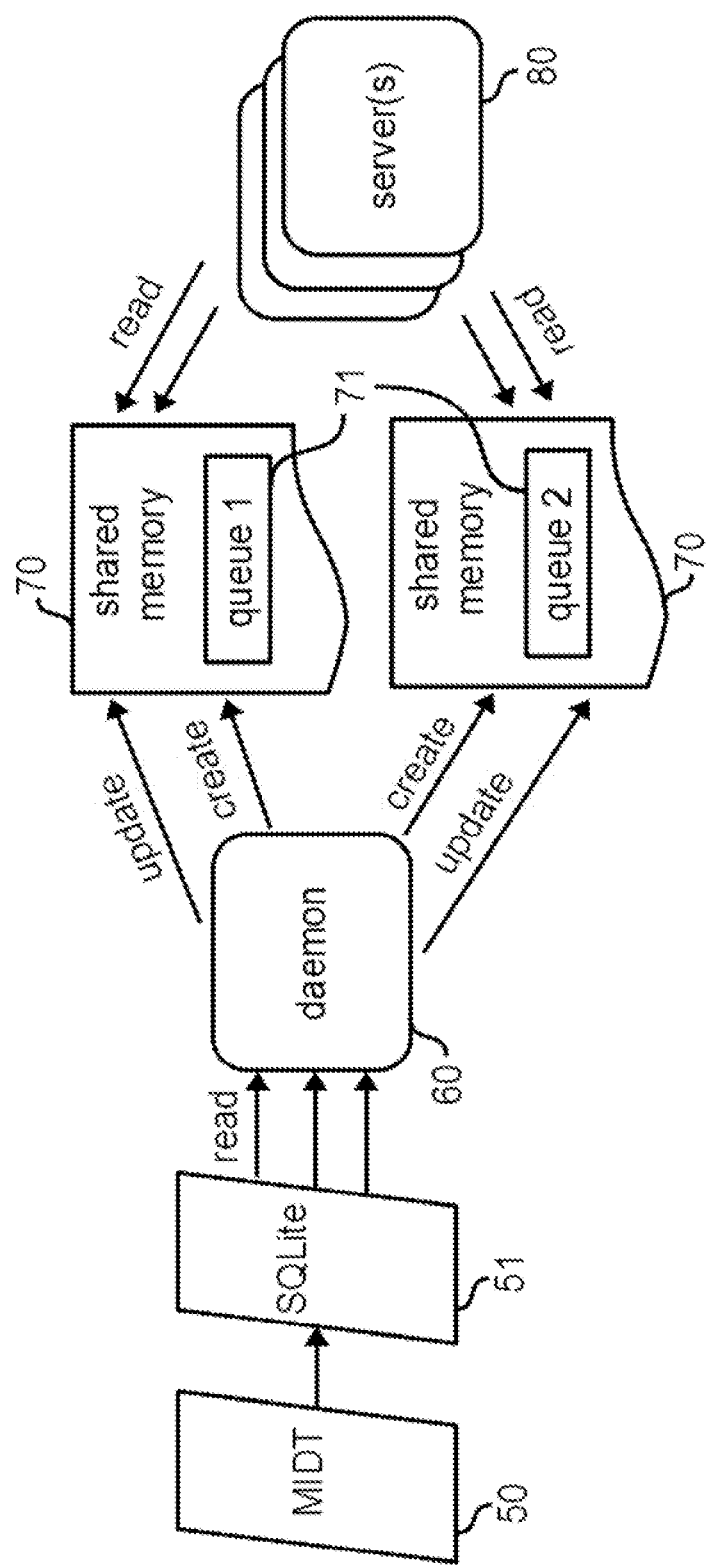
FIG. 5 is a diagrammatic view of a processing scheme for booking data stored in an MIDT file using shared memory and distributed queues.

A diagrammatic view of a processing scheme for booking data stored in an MIDT file using shared memory and distributed queues is given by FIG. 5.

Data for the search engine, such as schedules etc. is extracted out of an MIDT file. The data from the MIDT file 50 is transferred to at least one SQLite file 51. By feeding the search engine 1 (not shown) on data based on an SQLite file 51, search engine 1 only has to load the data it needs, rather than reading the entire MIDT file and holding a complete parse in memory. Small edits in the schedule data only overwrite the parts of the file that change. This reduces read/write time. The data is read from the SQLite file by a daemon 60.

The daemon 60 creates and updates a shared memory 70. The shared memory 70 is accessed by a plurality of servers 80, on which, for example, tasks related to different modules of the search engine 1 (not shown) are performed. The shared memory 70, is realized, for example, as a read-only memory (ROM), an Electrically Erasable Programmable Read-Only Memory (EEPROM), or a flash memory to which the servers have a read/write access. The data is processed in the form of distributed queues 71, to mitigate obsolescence risk for the processed data. In the example of FIG. 5 the distributed queue system is realized as two queues "queue 1" and "queue 2" being located on two different SSH units of the shared memory 70.

Figure 6:
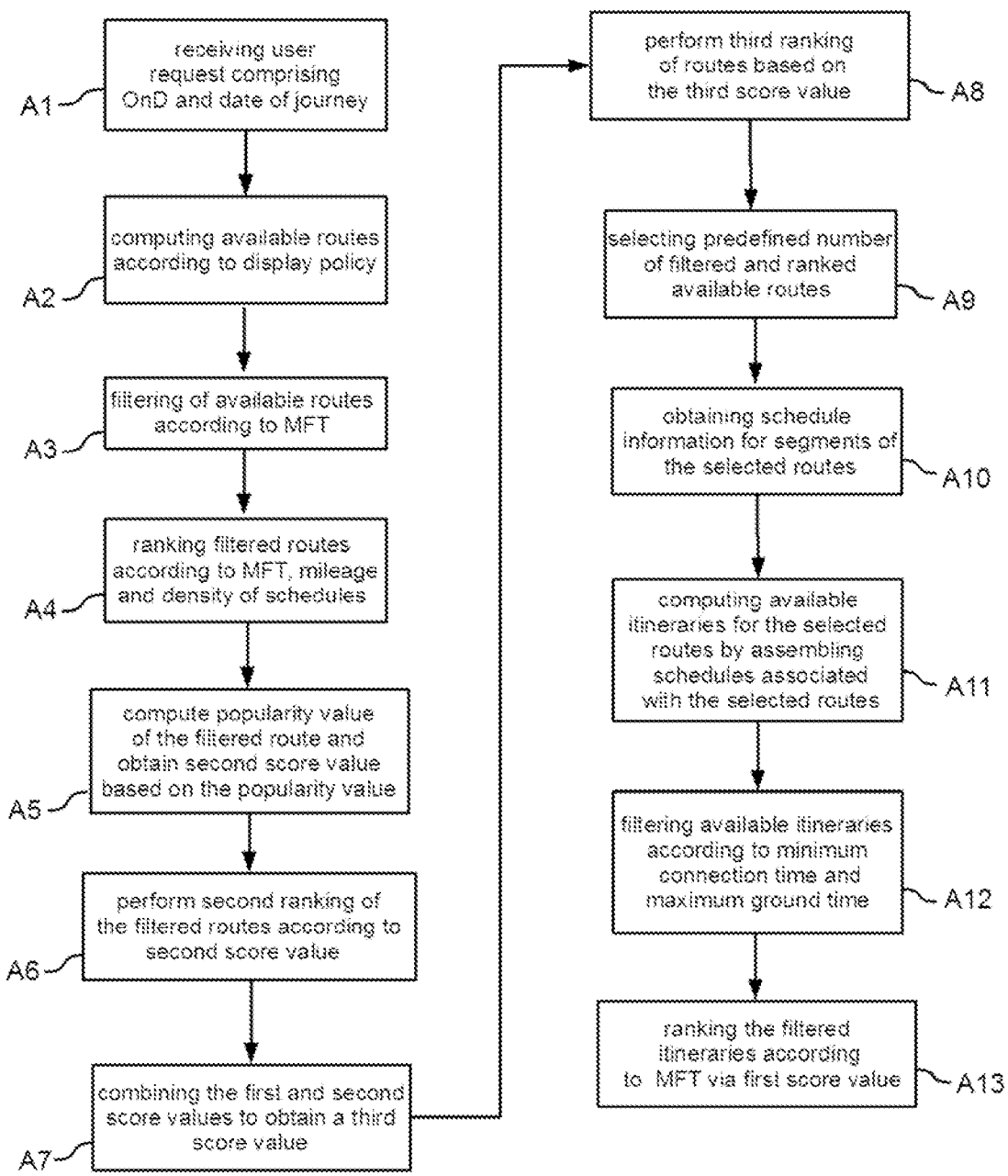
FIG. 6 is a flowchart showing a process performed by the flight search engine of FIG. 1, wherein historical booking data is taken into account when ranking routes.

A flowchart showing a process performed by the flight search engine of FIG. 1, wherein historical booking data is taken into account when ranking routes, is shown in FIG. 6.

In a first activity A1, a user request comprising an OnD and a date of a journey is received. In an activity A2, available routes are computed according to a display policy 20. These routes are filtered according to MFT in an activity A3. The filtered routes are ranked according to MFT, mileage and density of schedule in an activity A4. The popularity value of the filtered routes is computed and the second score value is computed based on the popularity value in an activity A5.

Subsequently, a second ranking of the filtered routes according to the second score value is performed in an activity A6. The first and second score values are combined to obtain a third score value in an activity A7. Based on this third score value a third ranking of the routes is performed on the basis of the third score value in activity A8. A predefined number of filtered and ranked available routes is selected in activity A9. For these selected routes, more precisely for segments of these routes schedule information is obtained in activity A10.

Based on this obtained schedule information, available itineraries are computed for the selected routes by assembling schedules associated with the selected routes to an itinerary A11. The available itineraries are subsequently filtered according to minimum connection time and maximum ground time in activity A12. The filtered itineraries are ranked according to MFT via a first score value associated therewith in activity A13.

Subsequently, fare information for each available itinerary may be obtained to yield priced itineraries and a subset of these priced itineraries may be displayed on a user interface.

Figure 7:
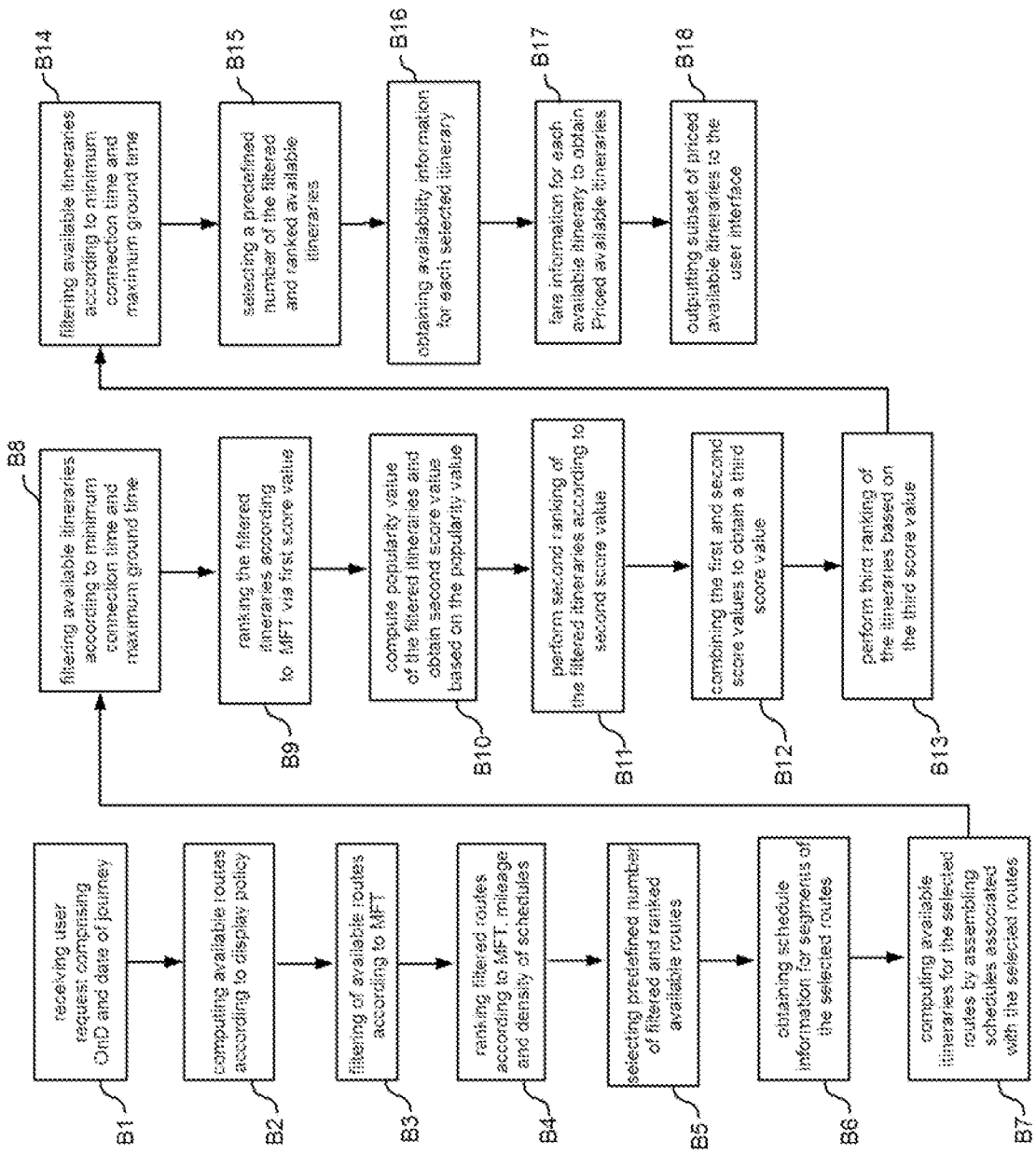
FIG. 7 is a flowchart showing a complete search process performed by the flight search engine of FIG. 1, wherein historical booking data is taken into account when ranking itineraries, and the search leads to a subset of priced itineraries output to a user's display.

A flowchart showing a complete search process performed by the flight search engine of FIG. 1, wherein historical booking data is taken into account when ranking itineraries is given by FIG. 7.

The first four activities (B1-B4) of this search process are identical to those of the part of the search process illustrated by the flowchart of FIG. 6.

Instead of the computation of a popularity value in the fifth activity, a predefined number of filtered available routes ranked according to MFT, mileage and density of schedules, is selected in activity B5. Schedule information for the segments of the selected routes is obtained in activity B6. Available itineraries for the selected routes are computed by assembling schedules associated with the selected routes in activity B7. The available itineraries are filtered according to minimum connection time and maximum ground time in activity B8. The filtered itineraries are ranked according to MFT via a first score value in B9.

Not until before activity B10 the popularity value of the filtered itineraries is computed and a second score value based on that popularity value is obtained. In activity B11 a second ranking of the filtered itineraries according to the second score value is performed. The first and second score value are combined to the third score value in activity B12. A third ranking of the itineraries based on the third score value is performed in activity B13.

The ranked itineraries are filtered according to minimum connection time and maximum ground time in activity B14. A predefined number of filtered and ranked available itineraries is selected in activity B15. In an activity B16, availability information is obtained for each selected itinerary. Additionally fare information for each available itinerary is obtained in activity B17 to obtain priced available itineraries. A subset of these priced available itineraries is outputted on the user interface in activity B18.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system comprising:
   one or more processors connected to a network; and
   a memory coupled to the one or more processors, the memory storing data comprising program code that, when executed by the one or more processors, causes the system to:
   iteratively update historical booking data through a distributed data queue system comprising a plurality of processing modules and shared memory blocks that are simultaneously accessed by the distributed data queue system, wherein each iteration comprises:
     obtain the historical booking data regarding previously booked itineraries for future travels;
     read, by the plurality of processing modules, the obtained historical booking data; and
     synchronize simultaneously the obtained historical booking data with latest updates of at least one marketing information data transfer file through the shared memory blocks of the distributed data queue system;
   receive a user request comprising an origin, a destination, and a date of a journey; and
   in response to the user request and based on a latest iteration of the updated historical booking data:
     compute available routes to travel from the origin to the destination based at least in part on a predefined display policy;
     filter the available routes based at least in part on a first set of predefined criteria associated with the available routes;
     rank, based on the latest iteration of the updated historical booking data, the filtered available routes based at least in part on a second set of predefined criteria associated with the available routes;
     construct itineraries associated with the filtered available routes on the date of the journey received in the user request based at least in part on the predefined display policy;
     filter the constructed itineraries based at least in part on a third set of predefined criteria associated with the itineraries; and
     rank, based on the latest iteration of the updated historical booking data, the filtered itineraries based at least in part on a fourth set of predefined criteria associated with the itineraries.

2. The system of claim 1 wherein the program code, when executed by the one or more processors, further causes the system to:
   receive the historical booking data; and
   analyze the historical booking data.

3. The system of claim 1 further comprising:
   a first data source including route segment information; and
   a second data source comprising schedule information,
   wherein the program code, when executed by the one or more processors, further causes the system to:
   find available segments from the first data source;
   assemble the available segments into available routes between the origin and the destination based at least in part on the predefined display policy;
   find schedules from the second data source that are associated with the available segments of the available routes between the origin and the destination; and
   assemble the schedules into available itineraries based at least in part on the predefined display policy.

4. The system of claim 1 wherein the first set of predefined criteria comprises a minimum expected traveling time associated with a route.

5. The system of claim 1 wherein the second set of predefined criteria comprises a minimum expected traveling time, a mileage, and a density of schedules associated with a route.

6. The system of claim 1 wherein the third set of predefined criteria comprises a minimum connection time and a maximum ground time in a connection point between two segments associated with an itinerary.

7. The system of claim 1 wherein the fourth set of predefined criteria comprises an elapsed time associated with an itinerary.

8. The system of claim 1 wherein the historical booking data comprises a number of bookings for a specific route or itinerary and a quantity of information about routes or itineraries between the origin and the destination, and the quantity of information is related to a distribution of a number of bookings across the available routes or itineraries between the origin and the destination.

9. The system of claim 1 wherein the historical booking data is considered by combining a first score value associated with at least one of the (i) first, (ii) the second, (iii) the third or (iv) the fourth set of predefined criteria with a second score value being based on a popularity value, and the popularity value corresponds to a weighted ratio calculated by weighting a ratio of a number of bookings for a specific route or itinerary and a maximum number of bookings on routes or itineraries between the origin and the destination with a quantity measure for information about routes or itineraries between the origin and the destination, thereby creating a third score value, wherein the route or itinerary is ranked by at least one of (i) a route ranking module or (ii) an itinerary ranking module based on the third score value.

10. The system of claim 1 further comprising a data source including the at least one marketing information data transfer file, wherein the at least one marketing information data transfer file is subsequently converted into at least one SQLite file, read by a daemon, and written to the shared memory blocks by the daemon.

11. The system of claim 10 wherein the shared memory blocks are synchronized with the latest iteration of the updated historical booking data.

12. A method of processing a user request, the method comprising:
iteratively updating historical booking data through a distributed data queue system comprising a plurality of processing modules and shared memory blocks that are simultaneously accessed by the distributed data queue system, wherein each iteration comprises:
obtaining the historical booking data regarding previously booked itineraries for future travels;
reading, by the plurality of processing modules, the obtained historical booking data; and
synchronizing simultaneously the obtained historical booking data with latest updates of at least one marketing information data transfer file through the shared memory blocks of the distributed data queue system;
receiving the user request comprising an origin, a destination, and a date of a journey, submitted by a user via a user interface; and
in response to the user request and based on a latest iteration of the updated historical booking data:
computing available routes to travel from the origin to the destination according to a display policy;
filtering all available routes according to at least a first set of predefined criteria associated with the available routes;
ranking, based on the latest iteration of the updated historical booking data, the filtered routes according to at least a second set of predefined criteria associated with the available routes, whereby a first route score value for each of the filtered routes is used;
selecting a predefined number of the filtered and ranked available routes;
obtaining schedule information corresponding to segments in the selected routes;
computing, according to the display policy, available itineraries for each route by assembling schedules associated with the segments of the route;
filtering all available itineraries according to a third set of predefined criteria associated with the itineraries; and
ranking, based on the latest iteration of the updated historical booking data, the filtered itineraries according to a fourth set of predefined criteria associated with the itineraries whereby a first itinerary score value for each of the filtered itineraries is created.

13. The method of claim 12, wherein ranking the filtered routes and/or ranking the filtered itineraries comprises:
obtaining, for each filtered route or itinerary, particular historical booking data regarding the route associated with the itinerary;
computing, based on the particular historical booking data, a popularity value of the filtered route or itinerary;
ranking the filtered routes or itineraries based on the popularity value of the route associated with the itinerary, whereby a second score value is created for each route or itinerary;
combining the first route score value or the first itinerary score value with the second score value for routes or itineraries that are present in both all the filtered routes or itineraries and the routes associated with the itineraries to obtain a third score value for those routes or itineraries; and
ranking the filtered routes or itineraries based on the third score value for each route or itinerary.

14. The method of claim 12 comprising:
after ranking the filtered itineraries according to the fourth set of predefined criteria:
selecting another predefined number of the filtered and ranked available itineraries;
obtaining availability information for each selected itinerary;
obtaining fare information for each available itinerary to obtain priced available itineraries; and
outputting a subset of filtered and ranked priced available itineraries on the user interface.

15. A computer program product comprising:
a non-transitory computer-readable storage medium; and
program code stored on the non-transitory computer-readable storage medium that, when executed by one or more processors, causes the one or more processors to:
iteratively update historical booking data through a distributed data queue system comprising a plurality of processing modules and shared memory blocks that are simultaneously accessed by the distributed data queue system, wherein each iteration comprises:
obtain the historical booking data regarding previously booked itineraries for future travels;
read, by the plurality of processing modules, the obtained historical booking data; and
synchronize simultaneously the obtained historical booking data with latest updates of at least one marketing information data transfer file through the shared memory blocks of the distributed data queue system;
receive a user request comprising an origin, a destination, and a date of a journey; and
in response to the user request and based on a latest iteration of the updated historical booking data:
compute available routes to travel from the origin to the destination based at least in part on a predefined display policy;
filter the available routes based at least in part on a first set of predefined criteria associated with the available routes;
rank, based on the latest iteration of the updated historical booking data, the filtered available routes based at least in part on a second set of predefined criteria associated with the available routes;
construct itineraries associated with the filtered available routes on the date of the journey received in the user request based at least in part on the predefined display policy;
filter the constructed itineraries based at least in part on a third set of predefined criteria associated with the itineraries; and
rank, based on the latest iteration of the updated historical booking data, the filtered itineraries based at least in part on a fourth set of predefined criteria associated with the itineraries.

\* \* \* \* \*